US 11,494,480 B2

(12) United States Patent
Peeters (10) Patent No.: US 11,494,480 B2
(45) Date of Patent: Nov. 8, 2022

(54) AUTHENTICATION METHOD

(71) Applicant: PROTON WORLD INTERNATIONAL N.V., Diegem (BE)

(72) Inventor: Michael Peeters, Tourinnes-la-Grosse (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 314 days.

(21) Appl. No.: 16/798,062

(22) Filed: Feb. 21, 2020

(65) Prior Publication Data

US 2020/0272724 A1    Aug. 27, 2020

(30) Foreign Application Priority Data

Feb. 22, 2019   (FR) ...................................... 1901849

(51) Int. Cl.
  *G06F 21/44*   (2013.01)
  *G06F 21/72*   (2013.01)
(52) U.S. Cl.
  CPC .............. *G06F 21/44* (2013.01); *G06F 21/72* (2013.01)
(58) Field of Classification Search
  CPC ......... G06F 21/44; G06F 21/72; G06F 21/445
  See application file for complete search history.

(56) References Cited

U.S. PATENT DOCUMENTS

| 2012/0020476 | A1* | 1/2012 | Billet ...................... H04L 9/304 380/28 |
| 2012/0069991 | A1 | 3/2012 | Junod |
| 2014/0089680 | A1* | 3/2014 | Goto ................... G06F 12/1408 713/189 |
| 2015/0163211 | A1* | 6/2015 | Chellappa ........... H04L 63/0876 713/155 |

FOREIGN PATENT DOCUMENTS

| EP | 2 251 813 A1 | 11/2010 |
| WO | 2010/112739 A1 | 10/2010 |

* cited by examiner

*Primary Examiner* — Nelson S. Giddins
(74) *Attorney, Agent, or Firm* — Seed Intellectual Property Law Group LLP

(57) ABSTRACT

A first circuit is authenticated using a second circuit. A first datum and a second datum are stored in the second circuit. The second datum corresponds to an application of a first function to the first datum and a third datum. The second circuit sends the second datum to the first circuit. The first circuit decrypts the second datum and sends a fourth datum representative of a result of the decrypting to the first second circuit for authentication. The second circuit verifies a correspondence between the first datum and the fourth datum.

29 Claims, 3 Drawing Sheets

AUTHENTICATION METHOD

BACKGROUND

Technical Field

The present disclosure relates generally to electronic devices or circuits.

Description of the Related Art

A communication between two electronic devices, or circuits, is often preceded by an authentication phase. During this phase, it is possible by means of an authentication method, implemented by the two devices, to verify if the two devices are authorized to communicate with each other.

Authentication methods are thus often used during communication between a device of a terminal type, such as, for example, a computer, a printer, or a payment terminal, and an electronic hardware item or device of a peripheral type, for example a consumable or an accessory. By means of the authentication method, it is possible in this case to validate the access of the peripheral-type device to the data and/or to functions of the terminal-type device. The authentication method is a first means of protection against malicious devices trying to access data and/or functions of other devices.

A conventional example of an authentication method used, for example between a computer and a user, is the use of an identifier and a password.

BRIEF SUMMARY

The inventor recognizes a need for more reliable authentication methods.

The inventor recognizes more specifically a need for more reliable authentication methods of a Verifier/Prover type.

Some embodiments of the present disclosure are directed to an authentication method between two electronic devices or circuits processing, for example, a communication method between these two devices or circuits. Some embodiments address all or some of the drawbacks of known authentication methods, and more specifically all or some of the drawbacks of known authentication methods of a Verifier/Prover type.

Some embodiments provide an authentication method for authenticating a first circuit by a second circuit, the second circuit storing at least one first datum and at least one second datum, the second datum corresponding to the result of the application of a first encryption function that corresponds to the inverse function of a second encryption function, comprising the following successive steps: the second circuit sends, to the first circuit, at least said second datum, the first circuit decrypts said second datum with the second function; and the first circuit sends a third datum representative of the first datum to the second circuit for authentication.

Some embodiments provide an authentication method, implemented by a first circuit adapted to implement an encryption function, comprising the following successive steps: receiving a second datum from a second circuit storing at least one first datum and at least one second datum, the second datum corresponding to the result of the application of a first encryption function that corresponds to the inverse function of a second encryption function; decrypting said second datum with the second function; and sending a third datum representative of the first datum to the second circuit for authentication.

Some embodiments provide an authentication method, implemented by second circuit storing at least one first datum and at least one second datum, the second datum corresponding to the result of the application of a first encryption function that corresponds to the inverse function of a second encryption function, comprising the following successive steps: sending at least said second datum to a first circuit adapted to implement the second encryption function; receiving a third datum representative of the first datum from the first circuit for authentication.

According to some embodiments, the second circuit verifies the correspondence between the third datum and the second datum.

According to some embodiments, the third datum corresponds to the first datum encoded by a third function different from the second function.

According to some embodiments, the third function is a signature function.

According to some embodiments, the third function is an encryption function.

According to some embodiments, the first datum acts as the encryption key or signature key for the third function.

According to some embodiments, the second function is only known by the first circuit.

According to some embodiments, the second datum corresponds to the application of the first encryption function to a combination of the first datum and a fourth datum.

According to some embodiments, the fourth datum is a random datum.

According to some embodiments, the combination is a concatenation.

According to some embodiments, the combination is an exclusive OR function.

According to some embodiments, the first and second data are stored in a correspondence table.

Some embodiments provide a circuit storing at least one first datum and at least one second datum, the second datum corresponding to the result of the application of a first encryption function that corresponds to the inverse function of a second encryption function, adapted to: send at least said second datum to a second circuit adapted to implement the second encryption function; and to receive a third datum representative of the first datum from the second circuit for authentication.

Some embodiments provide a circuit adapted to: receive at least one second datum from a second circuit storing at least one first datum and at least one second datum, the second datum corresponding to the result of the application of a first encryption function that corresponds to the inverse function of a second encryption function; decrypt said second datum with the second function; and send a third datum representative of the first datum to the second circuit for authentication.

Some embodiments provide a circuit comprising a correspondence table in which are stored: at least one second datum, the second datum corresponding to the result of the application, to a first datum, of a first encryption function that corresponds to the inverse function of a second encryption function; and at least one third datum representative of the first datum.

Some embodiments provide a method for authenticating a first circuit by a second circuit. The method includes: storing, at the second circuit, at least one first datum and at least one second datum, the second datum corresponding to a result of an operation of a first encryption function; sending, from the second circuit to the first circuit, the at least one second datum; decrypting, at the first circuit, the at least one second datum with a second encryption function, the second encryption function including an inverse function of the first encryption function; and sending, from the first circuit, a third datum representative of a result of the decrypting to the second circuit for authentication.

Some embodiments provide a device. The device includes: a first memory; and first cryptographic circuitry couple to the first memory, the first cryptographic circuitry, when in operation, performing acts including: receiving at least one first datum from a second circuit storing the at least one first datum, the at least one first datum corresponding to a result of a first encoding operation on at least one second datum, the first cryptographic circuitry configured to perform an inverse function of the first encryption operation on the received at least one first datum; generating a third data by decrypting the at least one first datum with the first encryption circuitry element; and sending the third datum to the second circuit for authentication.

Some embodiments provide a system. The system includes a first circuit storing at least one first datum and at least one second datum, the at least one second datum corresponding to a result of an operation of a first encryption function on the at least one first datum; wherein the first circuit is adapted to: send said at least one second datum to a second circuit; receive a third datum from the second circuit; and authenticate the second circuit by analyzing the third datum with respect to the at least one first datum to determine whether the third datum corresponds to an application of an inverse function of the first encryption function on the at least one second datum.

In an embodiment, a method for the authentication of a first circuit by a second circuit, the second circuit storing at least one first datum and at least one second datum, the image of the second datum by a first function being equal to the combination of the first datum and a third datum, the method comprising: the second circuit sending, to the first circuit, at least said second datum; the first circuit decrypting said second datum with the first function; and the first circuit sending a fourth datum representative of the first datum to the second circuit for authentication.

In an embodiment, an authentication method, implemented by a first circuit adapted to implement an first function, comprises: receiving at least one second datum from a second circuit storing at least one first datum and at least one second datum, the image of the second datum by a first function being equal to the combination of the first datum and a third datum; decrypting said second datum with the first function; and sending a fourth datum representative of the first datum to the second circuit for authentication.

In an embodiment, an authentication method, implemented by a second circuit storing at least one first datum and at least one second datum, the image of the second datum by a first function being equal to the combination of the first datum and a third datum, comprises: sending at least said second datum to a first circuit adapted to implement the first function; receiving a fourth datum representative of the first datum from the first circuit for authentication.

In an embodiment, the second circuit verifies the correspondence between the fourth datum and the first datum. In an embodiment, the fourth datum corresponds to the first datum encoded by a second function different from the first function. In an embodiment, the second function is a signature function. In an embodiment, the second function is an encryption function. In an embodiment, the first datum is encoded by the second function. In an embodiment, the first function is known only by the first circuit. In an embodiment, the first function is inversible. In an embodiment, the first function is not inversible. In an embodiment, the combination of the first datum and the third datum is a concatenation. In an embodiment, the combination of the first datum and the third datum is an exclusive OR function. In an embodiment, the first and second datum are stored in a correspondence table. In an embodiment, the third datum is stored in the correspondence table.

In an embodiment, a circuit stores at least one first datum and at least one second datum, the image of the second datum by a first function being equal to the combination of the first datum and a third datum. The circuit is adapted to: send said second datum to a second circuit adapted to implement the first function; and to receive a fourth datum representative of the first datum from the second circuit for authentication.

In an embodiment, a circuit is adapted to: receive a second datum from a second circuit storing at least one first datum and at least one second datum, the image of the second datum by a first function being equal to the combination of the first datum and a third datum; decrypt said second datum with the first function; and send a fourth datum representative of the first datum to the second circuit for authentication.

In an embodiment, a circuit comprises a correspondence table in which are stored: at least one second datum, the image of the second datum by a first function being equal to the combination of a first datum and a third datum; and at least one fourth datum representative of the first datum.

In an embodiment, a method for authenticating a first circuit by a second circuit, comprises: storing, at the second circuit, at least one first datum and at least one second datum, the second datum corresponding to a result of an operation of a first encryption function; sending, from the second circuit to the first circuit, the at least one second datum; decrypting, at the first circuit, the at least one second datum with a second encryption function, the second encryption function including an inverse function of the first encryption function; and sending, from the first circuit, a third datum representative of a result of the decrypting to the second circuit for authentication. In an embodiment, the second circuit verifies a correspondence between the third datum and the first datum. In an embodiment, the at least one second datum corresponds to a combination of the at least one first datum and a fourth datum generated by the operation of the first encryption function. In an embodiment, the fourth datum is a random datum. In an embodiment, the combination is a concatenation. In an embodiment, the combination is an exclusive OR function. In an embodiment, the at least one first datum and the at least one second datum are stored in a correspondence table.

In an embodiment, a device comprises: a first memory; and first cryptographic circuitry coupled to the first memory, the first cryptographic circuitry, in operation, receives at least one first datum from a second circuit storing the at least one first datum, the at least one first datum corresponding to a result of a first encoding operation on at least one second datum, the first cryptographic circuitry configured to perform an inverse function of the first encryption operation on the received at least one first datum; generates a third data by decrypting the at least one first datum with the first encryption circuitry element; and sends the third datum to the second circuit for authentication. In an embodiment, the first cryptographic circuitry includes signature circuitry, and the third datum is generated by the signature circuitry. In an embodiment, the first cryptographic circuitry includes encryption circuitry, and the third datum is generated by the encryption circuitry. In an embodiment, the inverse function is known only by the first cryptographic circuitry.

In an embodiment, a system comprises: a first circuit storing at least one first datum and at least one second datum, the at least one second datum corresponding to a result of an operation of a first encryption function on the at least one first datum; wherein the first circuit is adapted to: send said at least one second datum to a second circuit; receive a third datum from the second circuit; and authenticate the second circuit by analyzing the third datum with respect to the at least one first datum to determine whether the third datum corresponds to an application of an inverse function of the first encryption function on the at least one second datum. In an embodiment, the system comprises the second circuit, the second circuit storing a second encryption function including the inverse function of the first encryption function, the second circuit being adapted to: receive the at least one second datum from the first circuit; decrypt the at least one second datum with the second encryption function; generate the third datum based on a result of the decrypting the at least one second datum; and send the third datum to the first circuit for authentication. In an embodiment, the first circuit includes a correspondence table storing the at least one first datum and the third datum. In an embodiment, the at least one second datum includes a random datum and an encoded datum generated through an encoding operation based on the at least one first datum and the random datum. In an embodiment, the first circuit is adapted to send both the random number and the encoded number to the second circuit. In an embodiment, the inverse function of the first encryption function decrypts the encoded datum using the random datum. In an embodiment, the operation of the first encryption function on the at least one first datum is conducted outside the first circuit. In an embodiment, the first circuit receives the at least one second datum from a source that is different from the second circuit. In an embodiment, the analyzing the third datum with respect to the at least one first datum includes using a lookup table.

In an embodiment, a method of authenticating a first circuit using a second circuit, comprises: storing, at the second circuit, a first datum and a second datum, the second datum corresponding to an application of a first function to: the first datum; and a third datum; sending, from the second circuit to the first circuit, the second datum; decrypting, at the first circuit, the second datum; and sending, from the first circuit to the second circuit, a fourth datum representative of a result of the decrypting for authentication. In an embodiment, the second circuit verifies a correspondence between the first datum and the fourth datum. In an embodiment, the decrypting comprises applying a second function to the second datum. In an embodiment, the second function is an inverse of the first function. In an embodiment, the third datum is a random datum. In an embodiment, at least one of the first function and the second function is a combination function. In an embodiment, the combination function is a concatenation function. In an embodiment, the combination function is an exclusive OR function. In an embodiment, the first datum is one of a plurality of first datum, the second datum is one of a plurality of second datum and the second circuit stores the plurality of first datum and the plurality of second datum in a correspondence table.

In an embodiment, a device comprises, a memory; and cryptographic circuitry coupled to the memory, wherein: the cryptographic circuitry, in operation, responds to receipt of a first datum from a second device by: decrypting the first datum; and transmitting a second datum corresponding to a result of the decrypting to the second device; and the first datum corresponds to application of a first function to: a third datum stored in the second circuit; and a fourth datum. In an embodiment, the cryptographic circuitry, in operation, applies a second function to the first datum to decrypt the first datum. In an embodiment, the second function is an inverse of the first function. In an embodiment, the fourth datum is a random datum. In an embodiment, at least one of the first function and the second function is a combination function. In an embodiment, the combination function is a concatenation function. In an embodiment, the combination function is an exclusive OR function.

In an embodiment, a device comprises, a memory storing a first datum and a second datum, the second datum corresponding to an application of a first function to: the first datum; and a third datum; and authentication circuitry coupled to the memory, wherein the authentication circuitry, in operation: transmits the second datum to a second device; responds to receipt of a fourth datum from the second device by verifying a correspondence between the first datum and the fourth datum, wherein the fourth datum is representative of a result of decrypting of the second datum by the second device. In an embodiment, the fourth datum corresponds to application of a second function to the second datum. In an embodiment, the second function is an inverse of the first function. In an embodiment, the third datum is a random datum. In an embodiment, at least one of the first function and the second function is a combination function. In an embodiment, the combination function is a concatenation function. In an embodiment, the combination function is an exclusive OR function. In an embodiment, the first datum is one of a plurality of first datum, the second datum is one of a plurality of second datum and the device stores the plurality of first datum and the plurality of second datum in a correspondence table in the memory.

In an embodiment, a system comprises: a first circuit storing a first datum and a second datum, the second datum corresponding to application of a first function to: the first datum; and a third datum; and a second circuit, which, in operation, responds to receipt of the second datum from the first circuit by: decrypting the second datum; and sending a fourth datum representative of a result of the decrypting to the first circuit. In an embodiment, the first circuit, in operation, responds to receipt of the fourth datum by verifying a correspondence between the first datum and the fourth datum. In an embodiment, the second circuit, in operation, applies a second function to the second datum to decrypt the second datum. In an embodiment, the second function is an inverse of the first function. In an embodiment, the first datum is one of a plurality of first datum, the second datum is one of a plurality of second datum and the first circuit stores the plurality of first datum and the plurality of second datum in a correspondence table.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures unless the context indicates otherwise. In particular, the structural and/or functional features that are common among the various embodiments may have the same references and may have identical structural, dimensional and material properties.

For the sake of clarity, only the operations and elements that are useful for an understanding of the described embodiments herein have been illustrated and described in detail. In particular, this authentication method can be adapted to conventional communication methods.

Unless indicated otherwise, when reference is made to two elements that are connected together, this means a direct connection without any intermediate elements other than conductors, and when reference is made to two elements that are linked or coupled together, this means that these two elements can be connected or be linked or coupled by way of one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Figure 1:
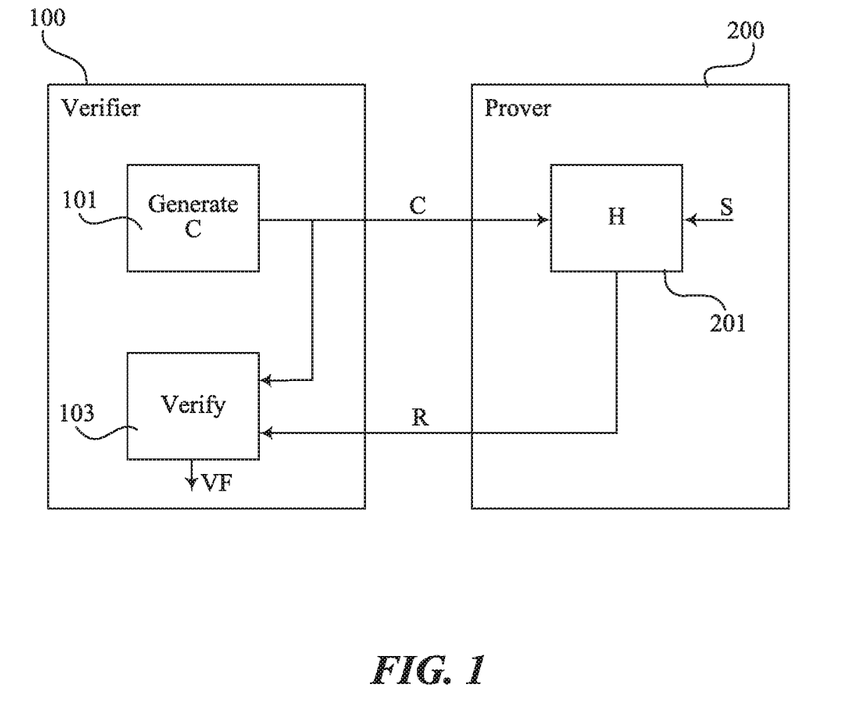
FIG. 1 illustrates schematically a block diagram depicting an example of an authentication method.

FIG. 1 depicts, schematically and in the form of blocks, the implementation of an authentication method between two circuits 100 (Verifier) and 200 (Prover).

The circuit 100 is, for example, part of a hardware item, while the circuit 200 is, for example, part of a consumable or accessory. The circuit 100 has the role of a verifier circuit vis-à-vis the circuit 200, the prover circuit, which authenticates itself.

The authentication method of FIG. 1 is an authentication method of a verifier/prover type, wherein the prover circuit 200 has to transmit, to the verifier circuit, a secret datum, for example a password, in order to authenticate itself.

The sequence of an example of this method is the following.

On the side of the circuit 100, a block 101 (Generate C) depicts a first step of the method in which the verifier circuit 100 generates a datum C. A new datum C is generated with each execution of the authentication act. Each datum C is different from that of the preceding authentication act. For instance, the datum C is generated by a counter, or by a system for generating a random number.

The datum C is then sent to the prover circuit 200.

On the side of the circuit 200, a block 201 (H) depicts a step of encoding the datum C by means of a secret datum S possessed by the prover circuit 200. The datum C is encoded by means of an encoding function H using the secret datum S as the encryption or signature key. For instance, the function H is an encryption function, for example a permutation. According to another example, the function H is a signature function.

The encoded datum, designated as R, is then sent to the prover circuit 100.

A block 103 (Verify) of the circuit 100 depicts a verification step for verifying, by the verifier circuit 100, the encoded datum R received from the prover circuit. For this purpose, the verifier circuit uses a verification function Verify. The function Verify takes, as an input, the datum C contained in the circuit 100, the encoded datum R and provides, as an output, an indication VF representative of the result of the authentication, for example a flag comprising a True state and a False state. The True state signifies that the authentication is successful, and the False state signifies the opposite. According to some embodiments, the circuit 100 knows the secret datum S, and the function Verify further takes the secret datum S as an input. For instance, in this case, the secret datum S is used as a symmetrical encryption key, the function Verify decrypts the datum R with the secret datum S, and then verifies if it corresponds to the expected datum. According to a further example, the function Verify does not require the decryption of the encoded datum R.

A drawback of the authentication method described in relation to FIG. 1 is that a person successful in analyzing the operation of the verifier circuit 100 could create a clone prover circuit adapted to authenticate itself vis-à-vis the verifier circuit, for example by extracting the secret datum S and/or the encryption function H.

Figure 2:
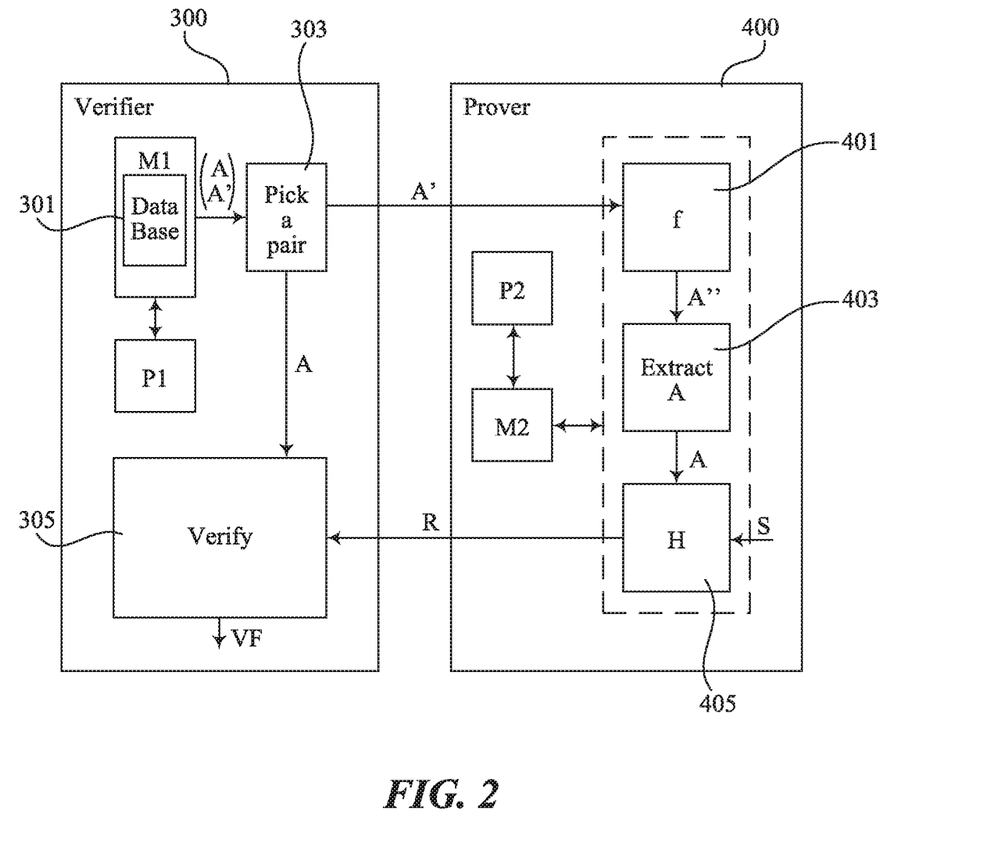
FIG. 2 illustrates schematically a block diagram depicting some embodiments of an authentication method.

FIG. 2 depicts, schematically and in the form of blocks, some embodiments of an authentication method between two circuits 300 (Verifier) and 400 (Prover). The authentication method is an authentication method of the type challenge/response.

In some embodiments, the circuit 300 is, for example, part of a hardware item, while the circuit 400 is, for example, part of a consumable or an accessory. The circuit 300 has the role of verifier circuit vis-à-vis the circuit 400, the prover circuit, which authenticates itself.

The verifier circuit 300 comprises a correspondence table, or data base, 301 comprising a plurality of data pairs (A, A'). In an embodiment, each data pair (A, A') may be represented by the following formula:

$$f(A')=g(A;\text{rand}) \qquad [\text{Algorithm 1}]$$

wherein:
 $f$ is a secret encryption function;
 g is a combination function; and
 rand is a random datum.

According to an embodiment, the function $f$ is an invertible function. In this case, each data pair (A, A') is composed of a datum A, generated similarly to datum C described in relation to FIG. 1, and of a datum A' defined by the following formula:

$$A'=f^{-1}(A'') \qquad [\text{Algorithm 2}]$$

wherein:
 $f^{-1}$ represents the inverse function of the secret encryption function $f$, and
 A" represents the result of the function g applied to the datum A and a random datum rand. That is: A"=g(A; rand).

According to a second embodiment, function $f$ is not an invertable function. In this case, each data pairs (A, A') comprises a datum A', generated similarly to datum C described in relation to FIG. 1, and of a datum A defined by the above-mentioned formula [Algorithm 1]. An inverse function of function g is used to determine datum A based on $f(A')$. The computation of this inverse function can, for example, use datum rand, or a piece of information derived from the datum rand, for example, its length. As an example, function g is a concatenation function, and datum A is obtained by truncating image $f(A')$ of datum A' by function $f$.

The data pairs (A, A') are generated by one or the other above-described embodiments during a personalization phase, for example implemented by a circuit external to circuit 300. Data pairs (A, A') are then stored in the correspondence table 301 of the circuit 300, for example when the circuit is manufactured. More specifically, during a phase of personalizing the circuit 300, a circuit external to the circuit 300 retrieves the data A from the correspondence table 301 in order to calculate the corresponding data A'. The data pairs (A, A') are then stored in the correspondence table 301. Thus, during the active phase of the circuit 300, the circuit 300 only stores the data A and A'. An advantage of this feature is that neither the secret function $f$ nor its inverse function $f^1$ is known by the verifier circuit 300.

The sequence of the embodiment of this method is the following.

On the side of the circuit 300, a block 303 (Pick a pair) depicts a step of choosing, from the correspondence table 301, a data pair (A, A'). For instance, the verifier circuit 300 chooses a data pair in a random manner.

The datum A' of the pair (A, A') is then sent to the prover circuit 400.

A block 401 ($f$) of the circuit 400 depicts a step of obtaining the datum A" from the datum A'. For this purpose, the circuit 400 uses the secret encryption function $f$ which the circuit 300 does not know, in order to obtain the datum A".

A block 403 (Extract A) depicts a step of determining the datum A from the datum A". As explained in the foregoing, the function g is a function by means of which it is possible to combine the datum A with the random datum rand. According to some embodiments, the function g is a concatenation function for concatenating the datum A and the datum rand, and, in this case, the function by means of which it is possible to determine A is a truncation function by means of which it is possible to eliminate the datum rand.

A block 405 (H) depicts a step of encoding the secret datum S possessed by the prover circuit 400. The secret datum S is encoded by means of the datum A and an encoding function H similar to the one described in relation to FIG. 1.

The encoded secret datum, designated as R, is then sent to the prover circuit 300.

A block 305 (Verify) of the circuit 300 depicts a verification step for verifying, by the verifier circuit 300, the encoded secret datum R received from the prover circuit. For this purpose, the verifier circuit uses a verification function Verify of the same type as the function Verify described in relation to FIG. 1, providing the binary value VF.

An advantage of this embodiment is that a person having access to the data A' and R transmitted between the circuits 300 and 400, in certain embodiments, contained in the circuit 300, will not be able to access the secret datum S without knowing the secret encryption function $f$ It is thus not necessary to protect the circuit 300 against the extraction of this secret function.

A further advantage of this embodiment is that a person having access to the data and to the functions of the verifier circuit 300 will not be able to generate new pairs (A, A') since the secret function $f$ is only encoded in the prover circuit 400.

Thus, in some embodiments, the circuits 300 and 400 adapted to implement the method described in relation to FIG. 2 are defined by the following features.

The circuit 300 comprises a correspondence table storing the data A and A'. The circuit 300 is further adapted to implement the function Verify.

The circuit 400 is adapted to implement the encryption function $f$ and the function H, and to extract the datum A from the datum A".

As illustrated, in some embodiments, the verifier 300 of FIG. 2 includes a processor P1 and a memory M1, in addition to the illustrated discrete circuitry 301, 303, 305. In some embodiments, the processor P1 and the memory M1 may be employed, alone or in various combinations with the illustrated discrete circuitry, to provide the functionality of the verifier 300. In some embodiments, the prover 400 of FIG. 2 includes a processor P2 and a memory M2, in addition to the illustrated discrete circuitry 401, 403 and 405. In some embodiments, the processor P2 and the memory M2 may be employed, alone or in various combinations with the illustrated discrete circuitry to provide the functionality of the prover 400.

Figure 3:
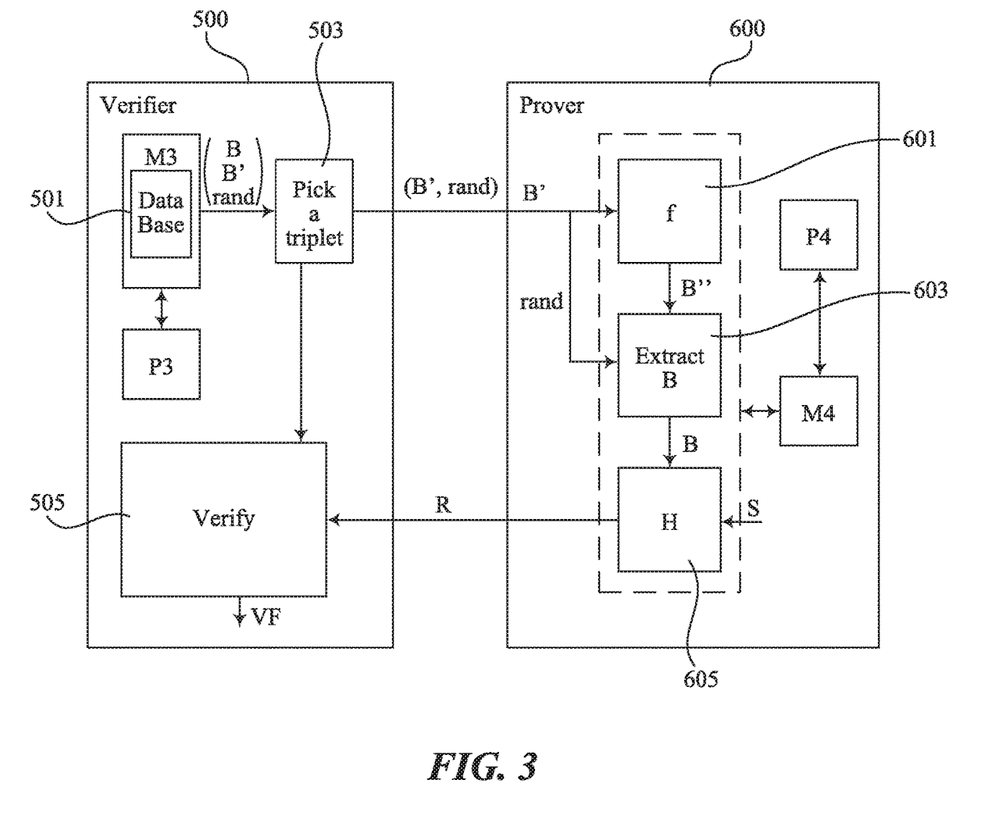
FIG. 3 illustrates schematically a block diagram depicting some embodiments of an authentication method.

FIG. 3 depicts, schematically and in the form of blocks, some embodiments of an authentication method between two circuits 500 (Verifier) and 600 (Prover). The authentication method is an authentication method of the type of challenge/response.

The circuit 500 is, for example, part of a hardware item, while the circuit 600 is, for example, part of a consumable or an accessory. The circuit 500 has the role of a verifier circuit vis-à-vis the circuit 600, the prover circuit, which authenticates itself.

The verifier circuit 500 comprises a correspondence table, or data base, 501 comprising a plurality of data triplets (B, B', rand). In an embodiment, each data triplet (B, B', rand) may be represented by the following formula:

$$f(B')=g(B;\text{rand}) \quad \text{[Algorithm 3]}$$

wherein:

$f$ is a secret encryption function; and g is a combination function.

According to a first embodiment, the function $f$ is an invertible function. In this case, each data pair (B, B', rand) is composed of a datum B, generated similarly to datum C described in relation to FIG. 1, of a random datum rand, and of a datum B' defined by the following formula:

$$B'=f^{-1}(B'') \quad \text{[Algorithm 4]}$$

wherein:

$f^1$ represents the inverse function of a secret encryption function $f$, and

B" represents the result of the expression g(B, rand).

According to a second embodiment, function $f$ is not an invertible function. In this case, each data triplets (B, B', rand) is composed of a datum B', generated similarly to datum C described in relation to FIG. 1, a randomly generated datum rand, and a datum B defined by the above-mentioned formula [Algorithm 3]. An inverse function of function g is used to determine, using datum rand, datum B based on $f(B')$. The computation of this inverse function can, for example, use the datum rand, or a datum derived from the datum rand. As an example, when data are binary words, function g is a logical combination function g of type exclusive OR (XOR) defined by the following formula:

$$g(B;\text{rand}))=B \oplus \text{rand} \quad \text{[Algorithm 5]}$$

wherein:

B and rand are binary words; and symbol $\oplus$ represents the exclusive OR function.

The data triplets (B, B', rand) are generated by one or the other above-described embodiments during a personalization phase, for example implemented by a circuit external to circuit 500. For example, each datum B is stored in the correspondence table 501 of the circuit 500 during the manufacture of the circuit 500. For example, during a phase of personalizing the circuit 500, a circuit external to the circuit 500 uses the data B from the correspondence table 501 to calculate the corresponding data B'. Data triplets (B, B', rand) are, then stored in the correspondence table 501. Thus, during the active phase of the circuit 500, the circuit 500 only stores the data B, B', and rand. An advantage of this feature is that neither the secret function $f$ nor, if applicable, its inverse function $f^1$ is known by the verifier circuit 500.

The sequence of the embodiment of this method is the following.

A block 503 (Pick a triplet) illustrates a step of choosing, from the correspondence table 501, a data triplet (B, B', rand). For instance, the verifier circuit 500 chooses a data triplet in a random manner.

The data B' and rand of the triplet (B, B', rand) are then sent to the prover circuit 600.

A block 601 ($f$) depicts a step of extracting the datum B" from the datum B'. The circuit 600 uses the secret encryption function $f$ to obtain the datum B".

A block 603 (Extract B) depicts a step of extracting or determining the datum B from the datum B". This step may use the random datum rand. As stated in the foregoing, the function g is a function by means of which it is possible to combine the datum B with the random datum rand. According to some embodiments where the data are binary words, the function g is a logical combination function of exclusive OR type. In this case, the extraction of the datum B may include application of a function g, defined by the following formula:

$$g(g(B;\text{rand});\text{rand}) = B \oplus \text{rand} \oplus \text{rand} \qquad \text{[Algorithm 6]}$$

wherein the symbol ⊕ represents the exclusive OR function.

A block 605 (H) illustrates a step of encoding the secret datum S possessed by the prover circuit 600. The secret datum S is encoded by means of the datum B and an encoding function H similar to the one described in relation to FIG. 1.

The encoded secret datum, designated as R, is then sent to the prover circuit 500.

A block 505 (Verify) depicts a verification step for verifying, by the verifier circuit 500, the encoded secret datum R received from the prover circuit. For this purpose, the verifier circuit uses a verification function Verify of the same type as the function Verify described in relation to FIGS. 1 and 2. Thus, the function Verify takes, as an input, the datum B and the encoded secret datum R, and provides, as an output, a binary indication VF.

The advantages of this embodiment are the same as the advantages of the embodiment described in relation to FIG. 2.

Thus, the circuits 500 and 600 adapted to implement the method described in relation to FIG. 2 are defined by the following features.

The circuit 500 comprises a correspondence table storing the data B, B' and rand. The circuit 500 is further adapted to implement the function Verify.

The circuit 600 is adapted to implement the encryption function $f$ and the function H, and to extract the datum B from the datum B" and, for example, from the random datum rand.

As illustrated, in some embodiments, the verifier 500 of FIG. 3 includes a processor P3 and a memory M3, in addition to the illustrated discrete circuitry 501, 503, 505. In some embodiments, the processor P3 and the memory M3 may be employed, alone or in various combinations with the illustrated discrete circuitry, to provide the functionality of the verifier 500. In some embodiments, the prover 600 of FIG. 3 includes a processor P4 and a memory M4, in addition to the illustrated discrete circuitry 601, 603 and 605. In some embodiments, the processor P4 and the memory M4 may be employed, alone or in various combinations with the illustrated discrete circuitry to provide the functionality of the prover 600.

An advantage of the authentication methods described in relation to FIGS. 2 and 3 is that they can be used to complement a classic authentication method, for example of the type described in relation to FIG. 1.

Various embodiments and variants have been described. Those skilled in the art will understand that certain features of these embodiments can be combined and other variants will readily occur to those skilled in the art.

In addition, a prover circuit of the same type as the circuits 400 and 600 comprising a correspondence table comprising all the data R corresponding to the data A' or B' sent by a verifier circuit of the same type as the circuits 300 and 500, is some embodiments.

Finally, the practical implementation of the embodiments and variants described herein is within the capabilities of those skilled in the art based on the functional description provided hereinabove.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of authenticating a first circuit using a second circuit, comprising:
storing, at the second circuit, a first datum and a second datum, the second datum corresponding to an application of a first function to:

the first datum; and
a third datum;
sending, from the second circuit to the first circuit, the second datum;
decrypting, at the first circuit, the second datum; and
sending, from the first circuit to the second circuit, a fourth datum representative of a result of the decrypting for authentication, wherein the fourth datum corresponds to the first datum encoded using a second function different from the first function.

2. The method of claim 1 wherein the second circuit verifies the correspondence between the first datum and the fourth datum.

3. The method of claim 1 wherein the decrypting comprises applying the second function to the second datum.

4. The method of claim 3 wherein the second function is an inverse of the first function.

5. The method of claim 3 wherein the third datum is a random datum.

6. The method of claim 3 wherein at least one of the first function and the second function is a combination function.

7. The method of claim 6 wherein the combination function is a concatenation function.

8. The method of claim 6 wherein the combination function is an exclusive OR function.

9. The method of claim 1, wherein the first datum is one of a plurality of first datum, the second datum is one of a plurality of second datum and the second circuit stores the plurality of first datum and the plurality of second datum in a correspondence table.

10. A device, comprising,
a memory; and
cryptographic circuitry coupled to the memory, wherein:
the cryptographic circuitry, in operation, responds to receipt of a first datum (D2) from a second device by:
decrypting the first datum (D2); and
transmitting a second datum (D4) corresponding to a result of the decrypting to the second device, wherein:
the first datum (D2) corresponds to application of a first function to:
a third datum (D1) stored in the second circuit; and
a fourth datum (D3); and
the second datum corresponds to the third datum encoded with a second function different from the first function.

11. The device of claim 10 wherein the cryptographic circuitry, in operation, applies the second function to the first datum to decrypt the first datum.

12. The device of claim 11 wherein the second function is an inverse of the first function.

13. The device of claim 10 wherein the fourth datum is a random datum.

14. The device of claim 11 wherein at least one of the first function and the second function is a combination function.

15. The device of claim 14 wherein the combination function is a concatenation function.

16. The device of claim 14 wherein the combination function is an exclusive OR function.

17. A device, comprising,
a memory storing a first datum and a second datum, the second datum corresponding to an application of a first function to:
the first datum; and
a third datum; and
authentication circuitry coupled to the memory, wherein the authentication circuitry, in operation:
transmits the second datum to a second device;
responds to receipt of a fourth datum from the second device by verifying a correspondence between the first datum and the fourth datum, wherein the fourth datum is representative of a result of decrypting of the second datum by the second device and the fourth datum corresponds to the first datum encoded using a second function different from the first function.

18. The device of claim 17 wherein the fourth datum corresponds to application of the second function to the second datum.

19. The device of claim 18 wherein the second function is an inverse of the first function.

20. The device of claim 18 wherein the third datum is a random datum.

21. The device of claim 18 wherein at least one of the first function and the second function is a combination function.

22. The device of claim 21 wherein the combination function is a concatenation function.

23. The device of claim 21 wherein the combination function is an exclusive OR function.

24. A device, comprising,
a memory storing a first datum and a second datum, the second datum corresponding to an application of a first function to:
the first datum; and
a third datum; and
authentication circuitry coupled to the memory, wherein the authentication circuitry, in operation:
transmits the second datum to a second device;
responds to receipt of a fourth datum from the second device by verifying a correspondence between the first datum and the fourth datum, wherein the fourth datum is representative of a result of decrypting of the second datum by the second device, and the first datum is one of a plurality of first datum, the second datum is one of a plurality of second datum and the device stores the plurality of first datum and the plurality of second datum in a correspondence table in the memory.

25. A system, comprising:
a first circuit storing a first datum and a second datum, the second datum corresponding to application of a first function to:
the first datum; and
a third datum; and
a second circuit, which, in operation, responds to receipt of the second datum from the first circuit by:
decrypting the second datum; and
sending a fourth datum representative of a result of the decrypting to the first circuit, wherein the fourth datum corresponds to the first datum encoded using a second function different from the first function.

26. The system of claim 25 wherein the first circuit, in operation, responds to receipt of the fourth datum by verifying the correspondence between the first datum and the fourth datum.

27. The system of claim 25 wherein the second circuit, in operation, applies the second function to the second datum to decrypt the second datum.

28. The system of claim 27 wherein the second function is an inverse of the first function.

29. The system of claim 25, wherein the first datum is one of a plurality of first datum, the second datum is one of a plurality of second datum and the first circuit stores the plurality of first datum and the plurality of second datum in a correspondence table.

\* \* \* \* \*